United States Patent
Xu et al.

(10) Patent No.: US 11,377,770 B2
(45) Date of Patent: Jul. 5, 2022

(54) CONTROL METHOD OF A WASHING MACHINE, AND WASHING MACHINE

(71) Applicant: QINGDAO HAIER DRUM WASHING MACHINE CO., LTD., Shandong (CN)

(72) Inventors: Sheng Xu, Shandong (CN); Zhenxing Huang, Shandong (CN); Wenwei Li, Shandong (CN); Jun Wu, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 318 days.

(21) Appl. No.: 16/496,131

(22) PCT Filed: Mar. 8, 2018

(86) PCT No.: PCT/CN2018/078380
§ 371 (c)(1),
(2) Date: Sep. 20, 2019

(87) PCT Pub. No.: WO2018/171434
PCT Pub. Date: Sep. 27, 2018

(65) Prior Publication Data
US 2021/0332520 A1    Oct. 28, 2021

(30) Foreign Application Priority Data
Mar. 23, 2017  (CN) .......................... 201710178806.3

(51) Int. Cl.
*D06F 33/44* (2020.01)
*D06F 33/70* (2020.01)
(Continued)

(52) U.S. Cl.
CPC .............. *D06F 33/44* (2020.02); *D06F 33/70* (2020.02); *D06F 34/05* (2020.02); *D06F 34/06* (2020.02);
(Continued)

(58) Field of Classification Search
CPC ..................................................... D06F 33/44
See application file for complete search history.

(56) References Cited

U.S. PATENT DOCUMENTS 9,791,838 B2   10/2017  Park et al.
9,951,451 B2    4/2018  Park et al.
(Continued)

FOREIGN PATENT DOCUMENTS

CN    103685450 A    3/2014
CN    103685451 A    3/2014
(Continued)

OTHER PUBLICATIONS

International Search Report (PCT/ISA/210) dated Jun. 15, 2018, by the Chinese Patent Office as the International Searching Authority for International Application No. PCT/CN2018/078380.
(Continued)

*Primary Examiner* — Spencer E. Bell
(74) *Attorney, Agent, or Firm* — Buchanan Ingersoll & Rooney PC

(57) ABSTRACT

A washing machine has a remote control function, and the control method comprises: after a washing procedure is finished, judging whether a remote control function is in an open state. If the judgment is yes, controlling a lock to keep a locked state, and executing a standby process for a time duration of t1, and if the judgment is no, controlling the lock to open, and executing a standby process for a time duration of t2, wherein t1≥t2; preferably, t1>t2. After a washing procedure is finished, the waiting time of a washing machine
(Continued)

when the remote control function is in an open state is longer than the waiting time of a washing machine when the remote control function is in a closed state, thereby effectively preventing a remote controller from missing further control of a washing machine in a standby process.

10 Claims, 1 Drawing Sheet

(51) Int. Cl.
*D06F 103/38* (2020.01)
*D06F 105/44* (2020.01)
*D06F 34/06* (2020.01)
*D06F 103/40* (2020.01)
*D06F 34/05* (2020.01)
*D06F 34/32* (2020.01)

(52) U.S. Cl.
CPC .......... *D06F 34/32* (2020.02); *D06F 2103/38* (2020.02); *D06F 2103/40* (2020.02); *D06F 2105/44* (2020.02)

(56) References Cited

U.S. PATENT DOCUMENTS

| | | | |
|---|---|---|---|
| 2014/0067094 A1* | 3/2014 | Park | H04M 1/72415 700/90 |
| 2015/0267338 A1 | 9/2015 | Helms et al. | |
| 2018/0069721 A1 | 3/2018 | Ha | |

FOREIGN PATENT DOCUMENTS

| | | |
|---|---|---|
| CN | 103718505 A | 4/2014 |
| CN | 105671862 A | 6/2016 |
| CN | 106400388 A | 2/2017 |
| EP | 2799609 A1 | 11/2014 |
| JP | 2015144627 A | 8/2015 |
| WO | 2014176918 A1 | 11/2014 |

OTHER PUBLICATIONS

Chinese Search Report issued by the Chinese Patent Office dated Dec. 22, 2020 in corresponding Chinese Application No. 201710178806; 3 pages.

European Extended Search Report issued by the European Patent Office dated Feb. 19, 2020 in corresponding European Patent Application No. 18770464.8; 10 pages.

* cited by examiner

CONTROL METHOD OF A WASHING MACHINE, AND WASHING MACHINE

TECHNICAL FIELD

The present disclosure relates to the field of a washing machine, in particular to a control method of a washing machine of an internet of things and a washing machine.

BACKGROUND ART

An internet of things is another global information wave after computers, internet and mobile communication network. Since 1999, concepts concerning internet of things have gradually begun to enter people's vision. The internet of things is deemed to be the next tera-scale information technology after internet. In recent years, countries around the world are intensifying their research in technology of internet of things.

The development of internet of things is divided into four stages: the first stage is networking of mainframe computers and host computers; the second stage is connection between desktop computers, notebook computers and the internet; the third stage is networking of some mobile devices such as a mobile phone; and the fourth stage is an emergence stage of embedded internet. More application devices which are closely related to daily life, including washing machines, refrigerators, televisions and microwave ovens, will all join the team of networking, and finally form a globally unified internet of things.

The so-called washing machine of an internet of things refers to a washing machine which can enable a washing machine and an object to be recognized by utilizing a radio frequency automatic identification technology. In terms of use, a washing machine of an internet of things can realize remote control of the washing machine and simultaneously check in real time operating state of a washing machine via such sensing devices as a computer and an intelligent terminal, and return related information of a washing machine via a control system. In terms of technology, a washing machine of an internet of things is a new technology in which various sensors and the existing internet are mutually connected, and is an extension of the internet technology. At present, an internet of things has begun to constantly change our life mode and consumption habit.

However, a washing machine is different from other products of internet of things, especially when functions of a washing machine are multiple; for example, a washing machine has a drying function and a shaking and dispersing function, etc. When a washing procedure of a washing machine is finished, when a controller is a remote controller, since the controller is not nearby a washing machine, therefore, generally, other things will lead to missing of continuously controlling a washing machine to dry or shake and disperse after a washing procedure is finished. Therefore, if a washing machine is under remote control, after a washing procedure is finished, the washing machine will be automatically shut down only after waiting for a short time, which may generally lead to the following phenomenon: after opening an intelligent terminal, a remote controller finds that information, showing that a washing procedure of a washing machine is finished, is pushed on an intelligent terminal, however, the waiting time has passed, and the washing machine has been shut down, a remote user's further intention of sending instructions of drying clothes or shaking and dispersing clothes has been out of date.

In view of this, the present disclosure is hereby proposed.

SUMMARY

A technical problem to be solved in the present disclosure is to overcome shortcomings of the prior art, and provide a control method of a washing machine. After a washing procedure is finished, the waiting time of a washing machine when the remote control function is in an open state is longer than the waiting time of a washing machine when the remote control function is in a closed state, thereby effectively preventing a remote controller from missing further control of a washing machine in a standby process, therefore, the present disclosure is more applicable to a washing machine of an internet of things, particularly to remote control via an intelligent terminal.

In order to solve the above technical problem, a basic conception of the technical solution adopted in the present disclosure is as follows:

A control method of a washing machine is provided, wherein the washing machine has a remote control function, and the control method includes: after a washing procedure is finished, judging whether the remote control function is in an open state, if a judgment result is yes, controlling a lock of the washing machine to keep a locked state, and executing a standby process for a time duration of t1, and if the judgment result is no, controlling the lock to open, and executing a standby process for a time duration of t2, wherein $t1 \geq t2$; preferably, $t1 > t2$.

Preferably, the remote control function is in an open state, if the washing machine does not receive a remote control instruction or a local control instruction in the standby process for the time duration of t1, the lock is kept at the locked state.

Preferably, the remote control function is in the open state, the washing machine is controlled to execute corresponding actions after receiving the remote control instruction in the standby process for the time duration of t1;

preferably, in the standby process for the time duration of t1, the washing machine also receive the local control instruction, and the washing machine closes the remote control function and executes corresponding actions after receiving the local control instruction.

Preferably, the standby process for a time duration of t1 of the washing machine is a process of suspending operation and waiting for a control instructions sent by the washing machine or an intelligent terminal.

preferably, the remote control function is in the open state, if the washing machine does not receive the remote control instruction or the local control instruction in the standby process for the time duration of t1, the lock is controlled to open and the washing machine is shut down after the standby process for a time duration of t1 is finished;

the remote control function is in a closed state, after the washing procedure is finished, the lock is controlled to open, and executes the standby process for a time duration of t2, if the washing machine does not receive the local control instruction in the standby process for the time duration of t2, the washing machine is shut down after the standby process for a time duration of t2 is finished.

preferably, the remote control function is in the open state, in the standby process for the time duration of t1, the washing machine only receives the remote control instruction;

or in the standby process for the time duration of t1, the washing machine receives both the remote control instruction and the local control instruction, after receiving the local control instruction, the washing machine closes the remote control function, and executes the local control instruction.

preferably, in the standby process for the time duration of t1, the washing machine further executes a prompting procedure to prompt a user of a finish of the washing procedure, after the washing machine receives the remote control instruction or the local control instruction, the prompting procedure is closed and the remote control instruction or local control instruction is executed;

preferably, the prompting procedure includes: the washing machine prompts a user of finish of the washing procedure via a state indicating device, wherein the state indicating device includes any one or any combination of a display screen, an indicating light and an audible device; and preferably, the washing machine is remotely controlled by the intelligent terminal, and the prompting procedure includes: the intelligent terminal is controlled to prompt a remote user of the finish of the washing procedure via text information and/or acoustic information.

Preferably, the control method includes the following steps:

S1, finishing the washing procedure;

S2, judging whether the remote control function is in an open state, if the judgment result is yes, executing step S3, if the judgment result is no, executing step S4;

S3, controlling the lock to keep the locked state, and executing the standby process for a time duration of t1; and S4, controlling the lock to open, and executing the standby process for a time duration of t2.

Preferably, the washing machine has a drying function and a shaking and dispersing function, and the remote control instruction and the local control instruction include any instruction of a drying instruction, a shaking and dispersing instruction, a shutdown instruction and a pause instruction.

The present disclosure further provides a washing machine which adopts the above control method of the washing machine.

After the above technical solution is adopted, the present disclosure has the following beneficial effects:

The present disclosure discloses a control method of a washing machine. The washing machine has a remote control function. The control method includes: after a washing procedure is finished, judging whether a remote control function is in an open state, if the judgment result is yes, controlling the lock to keep a locked state, and executing a standby process for a time duration of t1, and if the judgment result is no, controlling the lock to open, and executing a standby process for a time duration of t2, wherein t1≥t2; preferably, t1>t2. In the present disclosure, after a washing procedure is finished, the waiting time of the washing machine when the remote control function is in an open state is longer than the waiting time of the washing machine when the remote control function is in a closed state, thereby being beneficial for a remote user to further input control instructions after the finish of clothes washing, and to control the washing machine to execute such instructions as drying, shaking and dispersing and pausing. In the present disclosure, the standby time of the washing machine when a remote control function is in an open state is prolonged, thereby effectively preventing a remote controller from missing further control of the washing machine in a standby process, therefore, the present disclosure is more applicable to the washing machine of an internet of things, particularly to remote control via an intelligent terminal.

A further detailed description will be given below on specific embodiments of the present disclosure in combination with accompanying drawings.

BRIEF DESCRIPTION OF THE DRAWINGS

As a part of the present application, accompanying drawings are used for providing a further understanding of the present disclosure, schematic embodiments and descriptions thereof of the present disclosure are used for explaining the present disclosure, rather than constituting an improper limit to the present disclosure. Obviously, accompanying drawings described below are merely some embodiments, for those skilled in the art, other drawings can be obtained based on these drawings without any creative effort. In the drawings.

Figure 1:
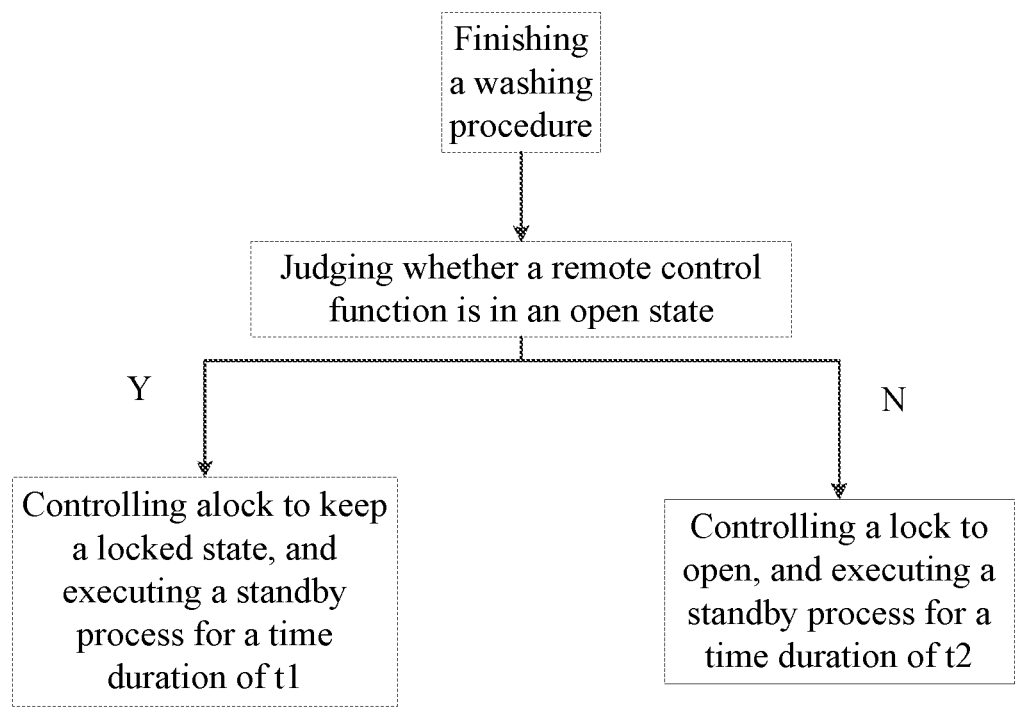
FIG. 1 is a logic diagram of the control method of a washing machine in the present disclosure.

It should be noted that, these drawings and text descriptions are not aiming at limiting a conception range of the present disclosure in any form, but to describe concepts of the present disclosure for those skilled in the art with a reference to specific embodiments.

DETAILED DESCRIPTION OF THE EMBODIMENTS

In order to make the object, technical solutions and advantages of the present disclosure clearer, a clear and complete description will be given below on technical solutions in the present embodiment in combination with accompanying drawings in embodiments of the present disclosure. The following embodiments are used for describing the present disclosure, rather than for limiting the scope of the present disclosure.

In the description of the present disclosure, it should be noted that, the directional or positional relationship indicated by such terms as "upper", "lower", "inner" and "outer" is the directional or positional relationship shown based on the drawings, which is merely for convenient and simplified description of the present disclosure, rather than indicating or implying that the referred device or element must have the specific direction or must be constructed and operated in the specific direction, therefore, it cannot be understood as a limitation to the present disclosure.

In the description of the present disclosure, it should be noted that, unless otherwise definitely prescribed and defined, the terms "installation" and "connected" should be understood in its broad sense. For example, the "connection" may be a fixed connection, may also be a detachable connection or an integrated connection; may be a mechanical connection, may also be an electrical connection; and the "connected" may be directly connected and can also be indirectly connected via an intermediate medium. The specific meaning of the above-mentioned terms in the present disclosure may be understood by those of ordinary skill in the art in light of specific circumstances.

The present disclosure provides a control method of a washing machine. The washing machine has a remote control function, the control function includes: after a washing procedure is finished, judging whether a remote control function is in an open state, if the judgment result is yes, controlling a lock of the washing machine to keep a locked state, and executing a standby process for a time duration of t1, and if the judgment result is no, controlling the lock to open, and executing a standby process for a time duration of t2, wherein t1≥t2; preferably, t1>t2.

In the present disclosure, after the washing procedure is finished, the waiting time of the washing machine when the remote control function is in an open state is longer than the waiting time of the washing machine when the remote control function is in a closed state, thereby being beneficial for a remote user to further input control instructions after the finish of clothes washing, and to control the washing machine to execute such instructions as drying, shaking and dispersing and pausing. In the present disclosure, the standby time of the washing machine when the remote control function is in the open state is prolonged, thereby effectively preventing a remote controller from missing further control of the washing machine in a standby process, therefore, the present disclosure is more applicable to the washing machine of an internet of things, particularly to remote control via an intelligent terminal.

Wherein, t1 is 6-15 minutes, and t2 is 2-6 minutes, preferably, t1 is 10 minutes, and t2 is 3 minutes. In the present disclosure, setting t1 to be 10 minutes is based on a consideration of both clothes and users. Firstly, after the washing procedure is finished, clothes are unfit for being placed for too long a time, secondly, the waiting time of the washing machine cannot be too short, therefore, setting t1 to be 10 minutes is the most reasonable time obtained by the inventor based on a large number of experimental statistics during long-term use.

Preferably, the standby process for a time duration of t1 is a process of suspending operation and waiting for a control instructions sent by the washing machine or an intelligent terminal. The washing machine in the present disclosure has multiple functions, after the washing procedure is finished, a user may think of further treatment of clothes, for example, drying clothes, and shaking and dispersing clothes. Therefore, after the washing procedure is finished, the washing machine suspends operation, and the executed standby process is actually a process of waiting for a user to further input other control instructions.

Preferably, if the washing machine does not receive the remote control instruction or the local control instruction in the standby process for the time duration of t1, the lock is kept at the locked state.

Preferably, the remote control function is in the open state, the washing machine is controlled to execute corresponding actions after receiving the remote control instruction in the standby process for the time duration of t1; and preferably, in the standby process for the time duration of t1, the washing machine also receives the local control instruction, and the washing machine closes the remote control function and executes corresponding actions after receiving the local control instruction.

Preferably, in the standby process for the time duration of t1, the washing machine further executes a prompting procedure to prompt a user of a finish of the washing procedure, after the washing machine receives the remote control instruction or the local control instruction, the prompting procedure is closed and the remote control instruction or the local control instruction is executed;

preferably, the prompting procedure includes: the washing machine prompts a user of the finish of the washing procedure via a state indicating device, wherein the state indicating device includes any one or any combination of a display screen, an indicating light and an audible device;

preferably, the washing machine is remotely controlled by the intelligent terminal, and the prompting procedure includes: the intelligent terminal prompts a remote user of the finish of the washing procedure via text information and/or acoustic information. For example, when the intelligent terminal is a mobile phone, after the washing procedure of the washing machine is finished, the washing machine sends a washing state of the washing machine to the mobile phone, after the mobile phone receives the state, the mobile phone prompts a user, of course, multiple solutions for prompting a user are available, for example, the mobile phone prompts a user via such manners as ringtones, vibrations and text information or prompts a user jointly via a combination of several manners.

Preferably, in the standby process for the time duration of t1, if the washing machine does not receive the remote control instruction or the local control instruction, the lock is controlled to be opened and the washing machine is shut down after the standby process for a time duration of t1 is finished; in the standby process for the time duration of t1, the washing machine receives the remote control instruction or the local control instruction. It should be noted that, when the washing machine receives the local control instruction, the remote control function will be closed, and the local instruction is executed, and such a setting effectively prevents conflict between the remote control instruction and the local control instruction, since such a conflict may lead to potential safety hazards. For example, when the local control instruction is a pause instruction, and the lock needs to open, while at this time, the remote control instruction is a drying instruction, then safety problem will arise directly.

The remote control function is in a closed state, after the washing procedure is finished, the lock is controlled to open, and executes the standby process for a time duration of t2, if the washing machine does not receive the local control instruction in the standby process for the time duration of t2, the washing machine is shut down after the standby process for a time duration of t2 is finished. In the technical solution, the standby process for a time duration of t2 is relatively short, and the washing machine does not need to wait for a longer time.

Preferably, in the standby process for the time duration of t1, the washing machine only receives the remote control instructions, the setting of the method is based on the consideration that a user on a local is not clear of intentions of a user at a remote, for example, the user at a remote wants to control the washing machine to dry, while the user at a local is not clear and instead arbitrarily executes a pause or shutdown instruction, then the user at a remote cannot control the washing machine to execute subsequent operations.

Or in the standby process for the time duration of t1, the washing machine receives both the remote control instruction and the local control instruction, when the washing machine receives the local control instruction, the washing machine closes the remote control function, and executes the local control instruction. The setting of the technical solution is based on the consideration that the user at a remote intelligent terminal is not beside the washing machine and is not clear of a state of the washing machine, therefore, improper remote instructions may exist, therefore, in the standby process for the time duration of t1, the washing machine also receives the local control instruction, and after the local machine receives the control instruction, the remote control function will be directly closed, thereby preventing a remote intelligent terminal from sending improper control instructions, since this may lead to safety problems.

Preferably, the washing machine has a drying function and a shaking and dispersing function, and the remote control instruction and the local control instruction include any instruction of a drying instruction, a shaking and dispersing instruction, a shutdown instruction and a pause instruction.

Preferably, the washing machine further includes the intelligent terminal, the washing machine is in communication connection with the intelligent terminal, the intelligent terminal and the washing machine establish a control channel for remote control of the washing machine, when the control channel is communicated, then the washing machine judges that the remote control function is in the open state, if the control channel is disconnected, then the washing machine judges that the remote control function is in the closed state.

Preferably, a state feedback channel for receiving in real time state information of the washing machine is further established between the intelligent terminal and the washing machine. When the washing machine and the intelligent terminal are respectively connected to a network, the state feedback channel is in a communicated state, the control channel between the intelligent terminal and the washing machine is in the closed state by default, the opening of the control channel should be authorized by the washing machine.

As an embodiment of the present disclosure, the washing machine has a remote control function. After the finish of the washing procedure, in the standby process for the time duration of t1 of the washing machine, whether the lock should be unlocked is controlled according to operation state parameters of the washing machine.

Preferably, when the remote control function is in the open state, after the washing machine receives the pause instruction in the standby process for the time duration of t1, the lock is kept at the locked state; in the present solution, the lock is set to keep a locked state, if the lock is not set like this, for example, the lock is opened after the washing machine receives the pause instruction, the intelligent terminal continuously controls the washing machine and does not know that the lock is in an open state, then safety problem easily occurs.

When the remote control function is in the closed state, after the washing machine receives the pause instruction in the standby process for the time duration of t2, whether operating state parameters of the washing machine are within a safety range is judged, if the judgment result is yes, the pause instruction is executed and the lock is controlled to open, if the judgment result is no, the lock is controlled to open after operating state parameters of the washing machine are controlled to be within the safety range.

On the other hand, after the washing machine receives a shutdown instruction in the standby process for the time duration of t1, the washing machine is controlled to execute the following steps:

A1, closing the remote control function; and

A2, judging whether operating state parameters of the washing machine are within a safety range, if the judgment result is yes, opening the lock and executing the shutdown instruction, if the judgment result is no, directly executing the shutdown instruction, and controlling the lock of the washing machine to keep the locked state.

Of course, in step A2, unlocking and shutdown instructions can be executed after the washing machine controls operating state parameters to be within the safety range.

In the above solution, after the washing machine receives the shutdown instruction in the standby process for the time duration of t1, the washing machine will firstly close the remote control function, and remote control is finished, thereby ensuring safety.

Preferably, in step A2, after the washing machine is controlled to execute a shutdown instruction and is started again, the remote control function keeps the closed state, the washing machine judges whether its operation state parameters are within the safety range, if the judgment result is yes, the lock is controlled to open, if the judgment result is no, the lock is controlled to open after operating state parameters of the washing machine are controlled to be within the safety range.

In the present disclosure, after the washing machine is started again, the remote control function is in the closed state, and further the safety of clothes washing is ensured.

As an embodiment of the present disclosure, the washing machine has a drying function, and operating state parameters of the washing machine include: rotating speed, drying temperature, water temperature, and water level. When the remote control function of the washing machine is in the closed state, after the washing machine receives the pause instruction, whether the rotating speed, drying temperature, water temperature and water level are within the safety range is judged, and when each parameter is within the safety range, the lock can be opened. Of course, if any of the four parameters including the rotating speed, drying temperature, water temperature and water level is not within the safety range, the washing machine keeps the lock to be in the closed state, thereby ensuring safety of the washing machine and the user.

As an embodiment of the present disclosure, the washing machine has a drying function. The control method comprises: after the washing procedure is finished, and after the washing machine receives a pause or shutdown instruction in the standby process for the time duration of t1, drying temperature of the washing machine is acquired, and whether a drying temperature is the safety temperature is judged;

if the judgment result is yes, executing the instruction; and if the judgment result is no, executing the instruction after the temperature is lowered to a safety temperature, or directly executing the instruction, and controlling the lock of the washing machine to keep the locked state.

The controlling of an operating state value of the washing machine to be within the safety range includes a cooling treatment until a drying temperature is a safety temperature.

Preferably, the safety temperature is that the temperature value is less than a set value, preferably, the set value is 50-60° C., and most preferably, the set value is 55° C.

As an embodiment of the present disclosure, the washing machine includes a drying system which consists of an air blower, an air supply channel, and a heater arranged in the air supply channel. Air inhaled by the air blower is heated by the heater and is blown into a washing chamber of an inner drum of the washing machine through an air supply channel, and steam which brings away moisture in clothes is discharged from an air outlet of the washing machine, so as to dry clothes. The cooling treatment includes: the air inhaled by the air blower is directly blown into the washing chamber of the inner drum of the washing machine through the air supply channel, and the heat which is taken away is discharged from the air outlet of the washing machine.

As an embodiment of the present disclosure, the local control instruction is controlled by a control panel of the washing machine and sent to a controller of the washing machine, the remote control instruction is controlled by the intelligent terminal and sent to the controller of the washing machine, after receiving the local control instruction or the remote control instruction in the standby process for the time duration of t1, the washing machine is controlled to execute corresponding actions.

As an embodiment of the present disclosure, please refer to FIG. 1, the control method comprises the following steps:

S1, finishing the washing procedure;

S2, judging whether the remote control function is in the open state, if the judgment result is yes, executing step S3, if the judgment result is no, executing step S4;

S3, controlling the lock to keep the locked state, and executing the standby process for a time duration of t1; and S4, controlling the lock to open, and executing the standby process for a time duration of t2.

Wherein, in step S3, if the washing machine does not receive the remote control instruction or the local control instructions in the standby process for the time duration of t1, the lock is kept at the locked state; after the washing machine receives the remote control instruction in the standby process for the time duration of t1, the washing machine is controlled to execute corresponding actions; preferably, in the standby process for the time duration of t1, the washing machine also receives the local control instruction, and after receiving the local control instruction, the washing machine closes the remote control function, and executes corresponding actions.

In step S4, if the washing machine does not receive local control instructions in the standby process for the time duration of t2, the washing machine is shut down after the finish of the standby process for a time duration of t2.

The present disclosure provides a washing machine which adopts the control method of a washing machine in the above embodiment. The washing machine further includes an intelligent terminal, the washing machine is provided with a detachable activation device, and the washing machine is controlled to authorize or forbid the intelligent terminal from remotely controlling the washing machine via the activation device.

The activation device in the present disclosure is placed on the washing machine, or placed within a certain range around the washing machine. When the washing machine needs to be remotely controlled, a pre-controller only be authorized by the washing machine to remotely control the washing machine only via triggering the activation device by a pre-controller himself or by other persons beside the washing machine or nearby the washing machine, that is, if the washing machine needs to be remotely controlled, the activation device must be activated by someone nearby the washing machine, so as to forcibly execute safety check on the washing machine before remote control, thereby improving safety of the washing machine during remote control.

In one embodiment of the present disclosure, the activation device includes a near-field identification unit, and when the intelligent terminal is within an identification range of the near-field identification unit, the washing machine authorizes the intelligent terminal to remotely control the washing machine.

Specifically, the activation device includes an NFC card reader, the intelligent terminal is provided with an NFC label, after the NFC label is within a read range of the NFC card reader, the NFC card reader is in a triggering state, and then the washing machine authorizes the intelligent terminal to remotely control the washing machine. Of course, in the present disclosure, the activation device is not limited to the use of an NFC technique, and can also be an RFID card reader arranged on the washing machine. The mobile terminal is provided with an RFID label, the specific principle is the same as the above, and will not be repeated redundantly herein. Of course, the NFC card reader can also be arranged on the washing machine.

Preferably, the controller of the washing machine is in communication connection with the NFC card reader, the controller periodically detects the triggering unit, and if the triggering unit is in a triggered state, the controller authorizes the intelligent terminal to remotely control the washing machine.

Preferably, the activation device includes an activation key, the washing machine includes a controller, the activation key and the controller are in wired or wireless connection, the activation key includes a communication module which is in communication connection with the controller and a detection module which is configured to detect whether the activation key is triggered or not, the detection module sends signals to the controller via the communication terminal when detecting that the activation key is triggered, and the controller authorizes the intelligent terminal to remotely control the washing machine after receiving the signals.

As an embodiment of the present disclosure, the washing machine includes a controller, the activation device includes an activation key which is arranged on a cabinet of the washing machine, the activation key is in communication connection with the controller of the washing machine to trigger the activation key, then the controller of the washing machine authorizes the intelligent terminal to remotely control the washing machine. In order to prevent mis-operation, for example, mis-operation by a child, the washing machine is provided with a box body which can be opened and closed, the activation key can be arranged within the box body, so as to effectively prevent mis-operation of a child. Further, the box body can be locked.

Preferably, the washing machine of the present disclosure further includes a cloud server, the cloud server is respectively connected with the controller and the intelligent terminal network, and is configured to receive washing information of the washing machine sent by the controller and send to the intelligent terminal, and receive control information sent by the intelligent terminal and send to the controller.

Preferably, the intelligent terminal and the controller of the washing machine establish a state feedback channel for the intelligent terminal to receive state information from the washing machine and a control channel for the washing machine to receive control instructions from the intelligent terminal. When the washing machine and the intelligent terminal are respectively connected to the network, the state feedback channel is in a connected state, and when the activation device is in a triggering state, the control channel is in a connected state.

When the remote control function is in the open state, and after the washing machine receives a shutdown instruction in the standby process for the time duration of t1, the controller will firstly control the control channel to be in a closed state, and whether the state feedback channel is closed is not defined in the present disclosure.

However, after the washing machine receives the shutdown instruction in the standby process for the time duration of t1, the controller controls the control channel to be in a closed state, the state feedback channel is in an open state, thereby being beneficial for the remote intelligent terminal to look over instructions executed at a local in real time.

Preferably, multiple intelligent terminals are available, and are respectively connected with the washing machine network via the state feedback channel, and when the control channel between any intelligent terminal and the washing machine is communicated, the controller controls the control channels between other intelligent terminals and the washing machine to be in a closed state.

Preferably, the activation key is detachably set on the cabinet of the washing machine, the activation key is further internally provided with a power supply module, the power supply module provides electric energy required when the communication module transmits signals, and the power supply module includes an energy conversion module and/or a built-in power supply.

The energy conversion device converts a kinetic energy generated in a process of pressing the activation key into an electric energy, and supplies power to the communication module with the electric energy.

Further, the washing machine further includes an operation panel arranged on the cabinet of the washing machine, wherein the operation panel is provided with an accommodation chamber, the activation key is arranged inside the accommodation chamber in a detachable manner. Preferably, the accommodation chamber includes a key groove and a connecting part which is arranged in an inner periphery of the accommodation chamber, and the activation key is connected and fixed with the connecting part.

Further, the connecting part is internally provided with at least one clamping hole, the activation key is provided with a clamping jaw which is matched with the clamping hole. The clamping jaw is clamped within the clamping hole, and the clamping hole limits the activation key from departing from the key groove.

Or, the activation key is fixed within the accommodation groove via magnetic adsorption, when the activation key is fixed within the accommodation groove via magnetic adsorption, placing and taking become more convenient.

Preferably, the accommodation chamber/key groove is internally provided with a power supply electrode, the activation key is correspondingly set with a charging electrode, the activation key is placed within the key groove, the power supply electrode is in contact with the charging electrode, and the washing machine charges the activation key.

At least one activation key is available in the present disclosure, and each activation key can be respectively used for authorizing different intelligent terminals to control the washing machine.

Preferably, the washing machine includes a display unit, and the display unit is configured to display information of the intelligent terminal which is communicated with the washing machine via the state feedback channel; specifically, the display unit displays an account number in real time and position information of each terminal which is communicated with the washing machine via the state feedback channel.

Preferably, the display unit is configured to display control information sent by the control channel. Specifically, the display unit displays in real time an account number of an app corresponding to the intelligent terminal which controls the washing machine, and displays in real time control instruction information sent by the intelligent terminal via the control channel.

Preferably, the display unit is a display screen; the controller is connected with the display screen, and controls the display screen to display information of the intelligent terminal which is communicated with the washing machine via the state feedback channel.

Preferably, the display screen is a touch display screen, connected with the activation device, and is configured to receive instructions input by a user for authorizing any intelligent terminal to remotely control the washing machine or forbidding any intelligent terminal to remotely control the washing machine. In the present solution, multiple networked intelligent terminals are all connected with the washing machine via the state feedback channel. The intelligent terminal displays in real time washing state information of the washing machine, when another intelligent terminal requires to remotely control the washing machine, application information needs to be transmitted via the state feedback channel, the display screen display the application information, when authorization of the washing machine needs to be obtained, someone needs to click on the display screen to confirm, when multiple persons simultaneously apply for remotely controlling the washing machine within a certain time range, someone needs to click on an icon corresponding to the intelligent terminal which is to be pre-authorized on the di splay screen.

Of course, in the present disclosure, the activation device could be an NFC card reader or an activation key or a touch display screen or any combination of the three. Preferably, in the present disclosure, the activation device includes the activation key, the NFC card reader arranged on the washing machine or on the activation key, and the control display screen, thereby increasing approaches for authorization, being compatible with various intelligent terminals, and enlarging authorization approaches of the washing machine of internet of things. For example, when the intelligent terminal is a mobile phone, when the NFC label is arranged on the mobile phone, authorization can be realized via swiping the mobile phone, when the NFC label is not arranged on the mobile phone, authorization can be realized via triggering the activation key or the touch display screen. When the intelligent terminal is a remote computer, authorization cannot be realized via the NFC technique, authorization can be realized via triggering the activation key or clicking the touch display screen.

As an embodiment of the present disclosure, the activation key includes a key body and a key detection circuit, the key detection circuit detects key signals in real time, detects whether the key is pressed down and/or detects a time duration in which the key is pressed down, and sends the detection results to the controller, and the controller controls correspondingly according to the detection results.

Preferably, the detection circuit is configured to detect whether the key is pressed down, and send the detection results to the controller. The controller controls connection/disconnection of the control channel according to detection results; for example, when the detection circuit detects that the key is pressed down, the controller controls the control channel to be connected, and when the detection circuit detects again that the key is pressed down, the controller controls the control channel to be disconnected.

Or, the detection circuit is configured to detect whether a time duration in which the activation key is pressed down exceeds a set time duration, and send the detection results to the controller, and the controller controls connection/disconnection of the control channel according to detection results.

Or, the detection circuit is configured to detect number of times at which the activation key is pressed down within a set time duration, and the controller controls to open control channels between different intelligent terminals and the washing machine according to the number of times. In the solution, the controller determines which intelligent terminal should be authorized according to the number of times at which the activation key is pressed and via the number of times.

In an embodiment of the present disclosure, multiple intelligent terminals are available, and are respectively connected to the controller of the washing machine via the state feedback channel, and each intelligent terminal respectively remotely send a request information, which applies for control of the washing machine, via the state feedback channel; when any intelligent terminal sends the request information to the controller, the controller waits for the activation device to be activated, after the activation device is activated, the activation device will authorize the intelligent terminal corresponding to sending of the request information to remotely control the washing machine. In order to facilitate a user in remotely controlling the washing machine, the washing machine is provided with a loudspeaker. After the controller receives the request information, the controller will remind persons at home to trigger the activation device via a loudspeaker, in a process of triggering the activation device, the user will go beside the washing machine to press the activation key, and execute safety check on the washing machine, thereby effectively preventing accidents.

Preferably, when each intelligent terminal applies for remote control of the washing machine within a set time, after the controller waits for the activation device to be activated, the controller authorizes an intelligent terminal with the highest priority to control the washing machine; preferably, the priority is a preset priority or the priority is determined by a time sequence at which each intelligent terminal applies for remote control of the washing machine. Wherein, the washing machine is further provided with a storage which is configured to store historic information of remote control of the washing machine and to store priority of each intelligent terminal by a user.

It should be noted that, the technical solutions defined by the above embodiments of the present disclosure can be implemented separately, and can also be implemented in a combined manner. The technical solution defined by the above embodiment of the present disclosure can be applicable to a roller washing machine, and can also be applicable to an impeller-type washing machine.

What is described above is merely the preferred embodiments of the present disclosure, rather than limiting the present disclosure in any form, although the present disclosure has been disclosed above with the preferred embodiments, the preferred embodiments are not used for limiting the present disclosure, those skilled in the art can make some changes or modify into equivalent embodiments with equal changes by utilizing the above suggested technical contents without departing from the scope of the technical solution of the present disclosure, and the contents not departing from the technical solution of the present disclosure, any simple amendments, equivalent changes or modifications made to the above embodiments based on the technical essence of the present disclosure shall all fall within the scope of the solution of the present disclosure.

The invention claimed is:

1. A method for controlling a washing machine, wherein the washing machine has a remote control function, and the method comprises:
    after a washing procedure is finished, judging whether the remote control function is in an activated state,
    if a judgment result is yes, controlling a lock of the washing machine to keep a locked state, and executing a standby process for a time duration of t1,
    and if the judgment result is no, controlling the lock to open, and executing the standby process for a time duration of t2, wherein t1>t2,
    wherein the standby process is a process of no operation and waiting for a control instruction sent by the washing machine or an intelligent terminal, after the washing procedure is finished and before the washing machine is powered off.

2. The method for controlling the washing machine according to claim 1, wherein
    the remote control function is in the activated state, and
    if the washing machine does not receive the control instruction sent by the washing machine or the intelligent terminal in the standby process for the time duration of t1, the lock is kept at the locked state during the standby process for the time duration of t1.

3. The method for controlling the washing machine according to claim 1, wherein
    the remote control function is in the activated state, and
    the washing machine is controlled to execute corresponding actions after receiving the control instruction sent by the intelligent terminal in the standby process for the time duration of t1.

4. The method for controlling the washing machine according to claim 1, wherein
    the remote control function is in the activated state, and
    if the washing machine does not receive the control instruction sent by the washing machine or the intelligent terminal in the standby process for the time duration of t1, the lock is controlled to open and the washing machine is controlled to shut down after the standby process for the time duration of t1 is finished.

5. The method for controlling the washing machine according to claim 1, wherein the remote control function is in the activated state, and
    in the standby process for the time duration of t1, the washing machine only receives the control instruction sent by the intelligent terminal;
    or in the standby process for the time duration of t1, the washing machine receives the control instruction sent by both the washing machine and the intelligent terminal, the washing machine is controlled to deactivate the remote control function, and execute the control instruction sent by the washing machine after receiving the local control instruction.

6. The method for controlling the washing machine according to claim 1, wherein
    in the standby process for the time duration of t1, the washing machine is further controlled to execute a prompting procedure to prompt a user after the washing procedure is finished, and
    after the washing machine receives the control instruction sent by the washing machine or the intelligent terminal, the prompting procedure is controlled to be completed, and the control instruction sent by the washing machine or the intelligent terminal is executed.

7. The method for controlling the washing machine according to claim 1, wherein
    the washing machine comprises a drying function and a shaking and dispersing function, and
    the control instruction sent by the washing machine or the intelligent terminal comprises any instruction of a drying instruction, a shaking and dispersing instruction, a shutdown instruction and a pause instruction.

8. The method for controlling the washing machine according to claim 1, wherein
    the remote control function is in the activated state,
    in the standby process for the time duration of t1, the washing machine receives the control instruction sent by the washing machine, and the washing machine is controlled to deactivate the remote control function and executes corresponding actions after receiving the control instruction sent by the washing machine in the standby process for the time duration of t1.

9. The method for controlling the washing machine according to claim 2, wherein
the remote control function is in the activated state, and
if the washing machine does not receive the control instruction sent by the washing machine or the intelligent terminal in the standby process for the time duration of t1, the lock is controlled to open and the washing machine is controlled to shut down after the standby process for the time duration of t1 is finished.

10. The method for controlling the washing machine according to claim 1,
wherein when the remote control function is in a deactivated state, the lock is controlled to open, and the washing machine is controlled to execute the standby process for the time duration of t2 after the washing procedure is finished, and
wherein if the washing machine does not receive the control instruction sent by the washing machine in the standby process for the time duration of t2, the washing machine is controlled to shut down after the standby process for the time duration of t2 is finished.

* * * * *